US011198355B2

(12) United States Patent
Yang et al.

(10) Patent No.: US 11,198,355 B2
(45) Date of Patent: Dec. 14, 2021

(54) HYBRID POWER DRIVING SYSTEM

(71) Applicant: Guangzhou Automobile Group Co., Ltd., Guangdong (CN)

(72) Inventors: Yong Yang, Guangdong (CN); Jiangling Zhao, Guangdong (CN); Yang Shang, Guangdong (CN); Zeqing Dong, Guangdong (CN); Guoqiang Zu, Guangdong (CN); Qianru Su, Guangdong (CN)

(73) Assignee: GUANGZHOU AUTOMOBILE GROUP CO., LTD., Guangdong (CN)

( * ) Notice: Subject to any disclaimer, the term of this patent is extended or adjusted under 35 U.S.C. 154(b) by 0 days.

(21) Appl. No.: 16/337,940

(22) PCT Filed: Oct. 10, 2018

(86) PCT No.: PCT/CN2018/109607
§ 371 (c)(1),
(2) Date: Mar. 29, 2019

(87) PCT Pub. No.: WO2019/227815
PCT Pub. Date: Dec. 5, 2019

(65) Prior Publication Data
US 2021/0331574 A1 Oct. 28, 2021

(30) Foreign Application Priority Data
May 30, 2018 (CN) .......................... 201810541950.3

(51) Int. Cl.
*B60K 6/365* (2007.10)
*B60K 6/26* (2007.10)
(Continued)

(52) U.S. Cl.
CPC ................ *B60K 6/365* (2013.01); *B60K 6/26* (2013.01); *B60K 6/38* (2013.01); *B60K 2006/4816* (2013.01); *B60K 2006/4825* (2013.01)

(58) Field of Classification Search
None
See application file for complete search history.

(56) References Cited

U.S. PATENT DOCUMENTS

| 7,034,481 | B2* | 4/2006 | Imai | F16H 3/728 318/376 |
| 7,261,660 | B2* | 8/2007 | Sowul | B60K 6/445 475/5 |
| 2019/0202278 | A1* | 7/2019 | Kim | B60K 6/445 |

FOREIGN PATENT DOCUMENTS

| CN | 206141308 U | 5/2017 |
| CN | 107933285 A | 4/2018 |

(Continued)

*Primary Examiner* — Dirk Wright
(74) *Attorney, Agent, or Firm* — Gang Yu

(57) ABSTRACT

A hybrid power driving system includes an engine, a planetary gear device, a first motor, a clutch gear, a brake device, a first clutch, a second clutch, an intermediate shaft, and a second motor, wherein the engine and the first motor are connected by the planetary gear device, the planetary gear device includes a first rotating element, a second rotating element and a third rotating element, the first rotating element is connected to the first motor, and the second rotating element is connected to the engine, and the clutch gear is connected to the intermediate shaft; the brake device is configured to brake or unlock the third rotating element; and the second motor is connected to the intermediate shaft.

15 Claims, 13 Drawing Sheets

(51) Int. Cl.
*B60K 6/38* (2007.10)
*B60K 6/48* (2007.10)

(56) References Cited

FOREIGN PATENT DOCUMENTS

| | | | |
|---|---|---|---|
| CN | 207416539 U | 5/2018 | |
| CN | 208428949 U | 1/2019 | |
| DE | 102011089708 A1 * | 6/2013 | ............. B60K 6/365 |
| JP | 2016002882 A | 1/2016 | |
| KR | 101628130 B1 * | 6/2016 | ............... B60K 6/36 |
| WO | 2014055733 A1 | 4/2014 | |

* cited by examiner

HYBRID POWER DRIVING SYSTEM

TECHNICAL FIELD

The present disclosure relates to the technical field of new energy, and more particularly to a hybrid power driving system.

BACKGROUND

At present, the transmissions on the market mainly include two types of transmissions namely step-variable transmissions and continuously variable transmissions. The step-variable transmissions are subdivided into manual and automatic transmissions. Most of them provide a limited number of discrete input-output speed ratios through different meshing arrangements of a gear train or a planetary gear train. The adjustment of the driving wheel speed between two adjacent speed ratios is achieved by the speed change of an internal combustion engine. The continuously variable transmissions, whether mechanical, hydraulic, or machine-electric, can provide an infinite number of continuously selectable speed ratios within a certain speed range. Theoretically, the speed change of the driving wheel can be fully completed through the transmission. Thus, the internal combustion engine may operate within the best speed range as much as possible. The continuously variable transmission has better speed adjustment than the step-variable transmission, and can fully utilize the advantages of the maximum power of the internal combustion engine. Therefore, the continuously variable transmission has been the object of research by engineers all over the world for many years.

In recent years, the birth of a motor hybrid technology has opened up a new way to achieve complete power matching between the internal combustion engine and a power wheel. Among many power assembly design schemes, the most representative ones are series hybrid systems and parallel hybrid systems.

In the series hybrid system, an internal combustion engine, a generator, a motor, a shaft system and a driving wheel constitutes a series power chain, and the power assembly structure is extremely simple. The generator and motor combination can be regarded as a transmission in the traditional sense. When used in conjunction with an accumulator such as a battery and a capacitor, the transmission can be used as an energy adjustment device to achieve independent adjustment of speed and torque.

A parallel hybrid system has two parallel independent power trains. One consists of a traditional mechanical transmission, and the other consists of a motor and battery system. The mechanical transmission is responsible for speed adjustment, while the motor and battery system completes power or torque adjustment. In order to fully utilize the potential of the entire system, the mechanical transmission also needs to adopt a continuously variable transmission mode.

The series hybrid system has the advantages of simple structure and flexible layout. However, since all power passes through the generator and the motor, the power requirement of the motor is high, the volume is large, and the weight is heavy. Moreover, the efficiency of the entire system is low because the energy transfer process is subjected to mechanical-electrical transformation and electrical-mechanical transformation for two times. In the parallel hybrid system, only part of the power passes through the motor system, so the power requirements for the motor are relatively low, and the overall system efficiency is high.

However, the parallel hybrid system requires two separate subsystems, which are expensive and usually only used in weak hybrid systems.

SUMMARY

In view of this, embodiments of the present disclosure provide a hybrid power driving system, which has a simple structure, multiple operating modes and good platformization.

The embodiments of the present disclosure provide a hybrid power driving system, which includes an engine, a planetary gear device, a first motor, a clutch gear, a brake device, a first clutch, a second clutch, an intermediate shaft, and a second motor.

The engine and the first motor are connected by the planetary gear device, the planetary gear device includes a first rotating element, a second rotating element and a third rotating element, the first rotating element, the second rotating element and the third rotating element are one of a sun gear, a planetary carrier and a gear ring, respectively, the engine has an engine output shaft, the first motor has a first motor output shaft, the first rotating element is connected to the first motor output shaft, and the second rotating element is connected to the engine output shaft.

The clutch gear is sleeved on the first motor output shaft, the clutch gear is connected to the first motor output shaft through the first clutch, the first clutch is configured to engage or disengage the clutch gear with/from the first motor output shaft, the clutch gear is connected to the third rotating element through the second clutch, the second clutch is configured to engage or disengage the clutch gear with/from the third rotating element, and the clutch gear is connected to the intermediate shaft and outputs power to a wheel end through the intermediate shaft.

The brake device is configured to brake or unlock the third rotating element.

The second motor is connected to the intermediate shaft and outputs power to the wheel end through the intermediate shaft.

In an embodiment, the first rotating element is the sun gear, the second rotating element is the planetary carrier, and the third rotating element is the gear ring.

In an embodiment, the first clutch and the second clutch are integrated in the same housing.

In an embodiment, the first rotating element is the sun gear, the second rotating element is the gear ring, and the third rotating element is the planetary carrier.

In an embodiment, the first clutch and the second clutch are integrated in the same housing.

In an embodiment, the clutch gear is disposed between the first motor and the planetary gear device.

In an embodiment, a driving disc of the first clutch is fixedly connected to the first motor output shaft, the clutch gear is fixedly connected to a driven disc of the first clutch, one rotating disc of the second clutch is fixedly connected to the driven disc of the first clutch, and the other rotating disc of the second clutch is fixedly connected to the third rotating element.

In an embodiment, a first gear and a second gear are fixed to the intermediate shaft, and the first gear is meshed with the clutch gear; the second motor has a second motor output shaft, a third gear is fixed to the second motor output shaft, and the third gear is meshed with the first gear; and the hybrid power driving system further includes a differential, a differential gear is disposed on the differential, and the second gear is meshed with the differential gear.

In an embodiment, the hybrid power driving system has a first-stage pure electric mode, a second-stage pure electric mode, an extended range mode, a first-stage engine direct-drive mode, a second-stage engine direct-drive mode, a first-stage hybrid power mode, a second-stage hybrid power mode, a third-stage hybrid power mode, and a brake power generation mode.

In an embodiment, the first motor, the clutch gear, the planetary gear device and the engine are coaxially disposed.

In an embodiment, the brake device is a brake or a one-way clutch.

The hybrid power driving system provided by the embodiments of the present disclosure has a simple overall structure, and it has multiple operating modes such as a single-motor pure electric mode, a dual-motor pure electric mode, an extended range mode, two engine direct-drive modes, three hybrid power modes and a brake power generation mode, can automatically switch different modes according to a State of Charge (SOC) value and vehicle speed requirement of a battery, and has strong flexibility; moreover, during switching of the operating modes, a second motor participates in driving, and power is not interrupted. In addition, an engine and a first motor are connected by a planetary gear device, the speed ratio is adjustable, and the speed ratio range is large, which can effectively reduce the volume of the first motor. The hybrid power driving system can cover Hybrid Electric Vehicles (HEV) and Plug-in Hybrid Electric Vehicles (PHEV), and the platformization is good.

DETAILED DESCRIPTION OF THE EMBODIMENTS

To further explain the technical means and effects of the present disclosure for achieving the intended purpose of the present disclosure, the present disclosure will be described in detail below with reference to the accompanying drawings and preferred embodiments.

First Embodiment

Figure 1:
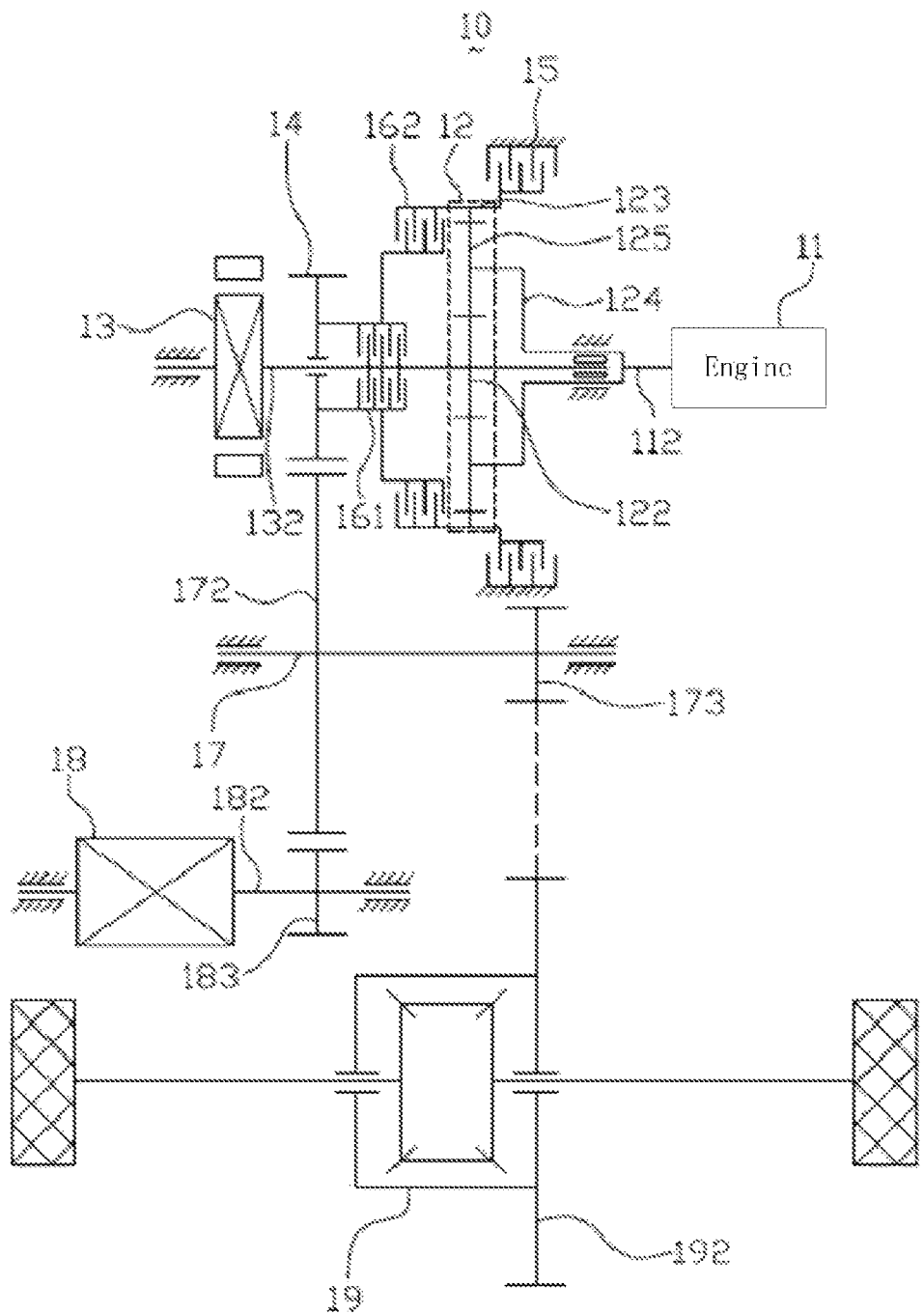
FIG. 1 is a structure diagram of a hybrid power driving system according to a first embodiment of the present disclosure.

FIG. 1 is a structure diagram of a hybrid power driving system according to a first embodiment of the present disclosure. As shown in FIG. 1, the hybrid power driving system 10 includes an engine 11, a planetary gear device 12, a first motor 13, a clutch gear 14, a brake device 15, a first clutch 161, a second clutch 162, an intermediate shaft 17, a second motor 18, a differential 19, and a power battery (not shown).

The engine 11 has an engine output shaft 112. In the present embodiment, the engine 11 is, for example, a gasoline engine or a diesel engine.

The first motor 13 has a first motor output shaft 132. The first motor 13 and the engine 11 are disposed coaxially, that is, the first motor output shaft 132 of the first motor 13 and the engine output shaft 112 of the engine 11 are in the same axis. In the present embodiment, the first motor 13 is a driving and power generation integrated machine.

The engine 11 and the first motor 13 are connected by the planetary gear device 12. The planetary gear device 12 includes a first rotating element, a second rotating element and a third rotating element, wherein the first rotating element is connected to the first motor output shaft 132 of the first motor 13, and the second rotating element is connected to the engine output shaft 112 of the engine 11. The first rotating element, the second rotating element and the third rotating element are one of a sun gear 122, a planetary carrier 124 and a gear ring 123, respectively. In the present embodiment, the first rotating element 122 is the sun gear 122, the second rotating element Is the planetary carrier 124, and the third rotating element is the gear ring 123. That is, in the present embodiment, the sun gear 122 is connected to the first motor output shaft 132, and the planetary carrier 124 is connected to the engine output shaft 112.

The planetary carrier 124 is provided with a planetary gear 125, and the planetary gear 125 is connected to the planetary carrier 124 through a rolling bearing or a sliding bearing. The sun gear 122 is disposed in the gear ring 123, the planetary gear 125 is disposed between the sun gear 122 and the gear ring 123, and the planetary gear 125 is meshed with the sun gear 122 and the gear ring 123, respectively.

The clutch gear 14, the first motor 13, the planetary gear device 12 and the engine 11 are coaxially disposed. The clutch gear 14 is disposed between the first motor 13 and the planetary gear device 12. The clutch gear 14 is sleeved on the first motor output shaft 132, that is, the first motor output shaft 132 and the clutch gear 14 are mutually unaffected when rotating.

The clutch gear 14 is connected to the first motor output shaft 132 through the first clutch 161, and the first clutch 161 is configured to engage or disengage the clutch gear 14 with/from the first motor output shaft 132. A driving disc of the first clutch 161 is fixedly connected to the first motor output shaft 132, and the clutch gear 14 is fixedly connected to a driven disc of the first clutch 161. When the first clutch 161 operates (that is, the driven disc is engaged with the driving disc), the first clutch 161 fixedly connects the clutch gear 14 to the first motor output shaft 132. At this time, the clutch gear 14 may synchronously rotate with the first motor output shaft 132. When the first clutch 161 does not operate (that is, the driven disc is separated from the driving disc), the clutch gear 14 is sleeved on the first motor output shaft 132, and the clutch gear 14 may rotate independently of the first motor output shaft 132.

The clutch gear 14 is connected to the third rotating element through the second clutch 162, and the second clutch 162 is configured to engage or disengage the clutch gear 14 with/from the third rotating element. One rotating disc of the second clutch 162 is fixedly connected to the driven disc of the first clutch 161, and the other rotating disc of the second clutch 162 is fixedly connected to the third rotating element. In the present embodiment, the third rotating element is the gear ring 123, that is, the second clutch 162 is configured to engage or disengage the clutch gear 14 with/from the gear ring 123. When the second clutch 162 operates (that Is, the two rotating discs are engaged), the second clutch 162 fixedly connects the clutch gear 14 to the gear ring 123. At this time, the clutch gear 14 may synchronously rotate with the gear ring 123. When the second clutch 162 does not operate (that is, the two rotating discs are separated), the clutch gear 14 and the gear ring 123 are separated from each other.

The brake device 15 is configured to brake or unlock the third rotating element (in the present embodiment, it is the gear ring 123). The brake device 15 is, for example, a brake or a one-way clutch. In the present embodiment, the brake device 15 is configured to brake or unlock the gear ring 123. When the brake device 15 operates, the brake device 15 brakes the gear ring 123, and at this time, the gear ring 123 cannot rotate. When the brake device 15 does not operate, the brake device 15 unlocks the gear ring 123, and at this time, the gear ring 123 can rotate.

The clutch gear 14 is connected to the intermediate shaft 17 and outputs power to a wheel end of a vehicle through the intermediate shaft 17. A first gear 172 and a second gear 173 are fixed to the intermediate shaft 17, the first gear 172 and the second gear 173 are spaced apart from each other, and the first gear 172 and the clutch gear 14 are meshed with each other.

The second motor 18 and the first motor 13 are disposed in parallel, and the second motor 18 is connected to the intermediate shaft 17 and outputs power to a wheel end of a vehicle through the intermediate shaft 17. Specifically, the second motor 18 has a second motor output shaft 182, a third gear 183 is fixed to the second motor output shaft 182, and the third gear 183 is meshed with the first gear 172. In the present embodiment, the second motor 18 is a driving and power generation integrated machine.

The differential 19 is provided with a differential gear 192, and the differential gear 192 is meshed with the second gear 173. The differential 19 is configured to adjust the speed difference between left and right wheels. When the vehicle is turning or driving on an uneven road, the left and right wheels are rolled at different speeds.

The power battery is electrically connected to the first motor 13 and the second motor 18, respectively. The power battery supplies electric energy for driving to the first motor 13 and the second motor 18, and electric energy generated by the first motor 13 and the second motor 18 during power generation may be stored in the power battery. In the present embodiment, the engine 11 drives the first motor 13 to rotate by the planetary carrier 124 and the sun gear 122 to generate electric energy, which may be stored in the power battery; when the vehicle brakes, power during braking passes through the differential 19, the differential gear 192, the second gear 173, the first gear 172 and the third gear 183 from the wheel end, and then is transmitted to the second motor 18 to drive the second motor 18 to rotate to generate electric energy, which may be stored in the power battery.

The hybrid power driving system of the present embodiment 10 has a first-stage pure electric mode, a second-stage pure electric mode, an extended range mode, a first-stage engine direct-drive mode, a second-stage engine direct-drive mode, a first-stage hybrid power mode, a second-stage hybrid power mode, a third-stage hybrid power mode, and a brake power generation mode.

Figure 2:
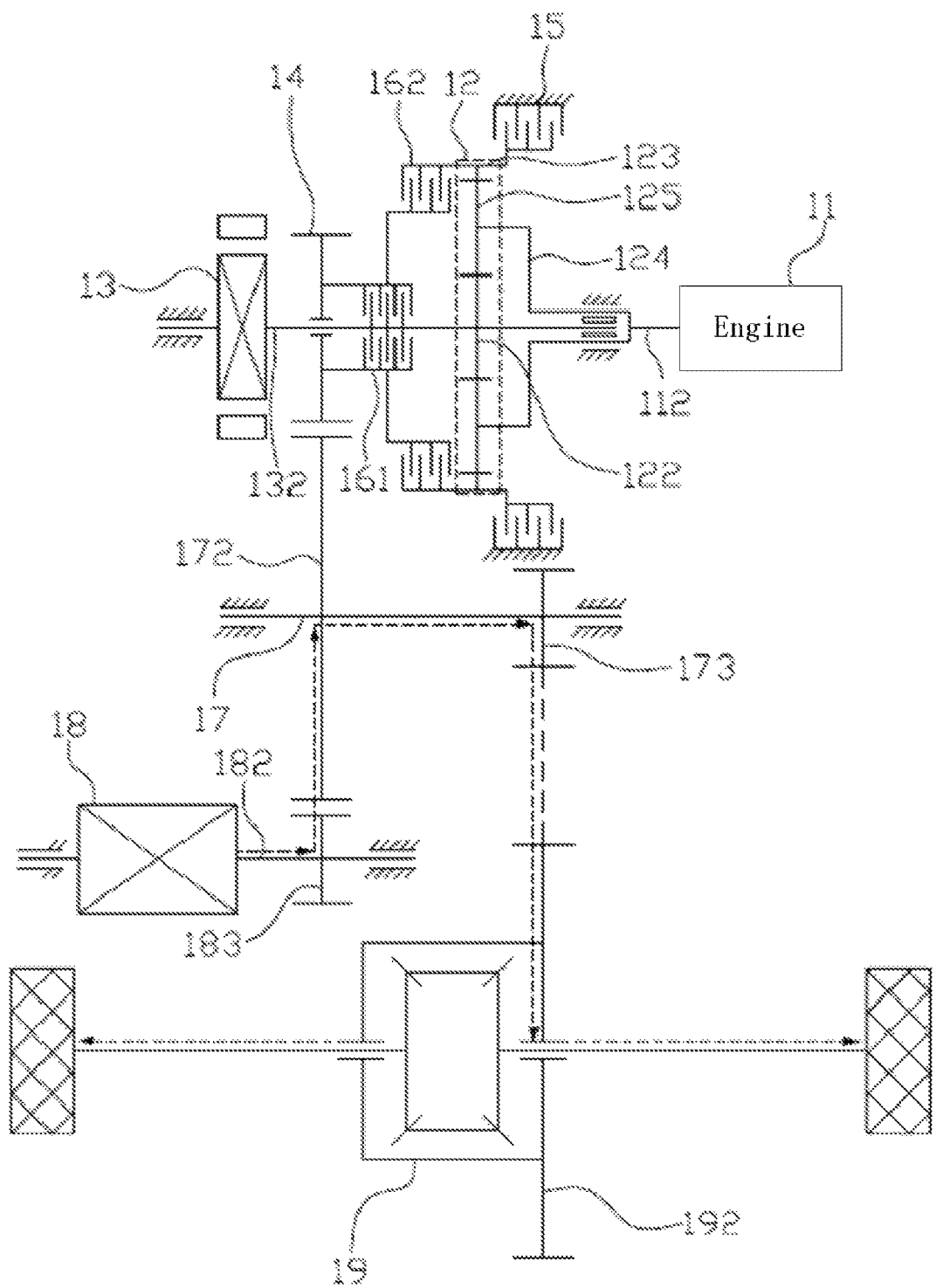
FIG. 2 is a schematic diagram of power transmission of the hybrid power driving system of FIG. 1 in a first-stage pure electric mode.

FIG. 2 is a schematic diagram of power transmission of the hybrid power driving system of FIG. 1 in a first-stage pure electric mode. The power transmission direction is as shown by the direction of an arrow in the figure. In the first-stage pure electric mode, the brake device 15, the first clutch 161, the second clutch 162, the engine 11 and the first motor 13 do not operate, and the second motor 18 performs driving. At this time, the power transmission has a path that transmits power by the second motor 18 through the third gear 183 to the first gear 172, the intermediate shaft 17, the second gear 173, the differential gear 192, the differential 19, and the wheel end finally. When the vehicle is driving at low to medium speeds, the hybrid power driving system 10 can perform driving in the first-stage pure electric mode.

Figure 3:
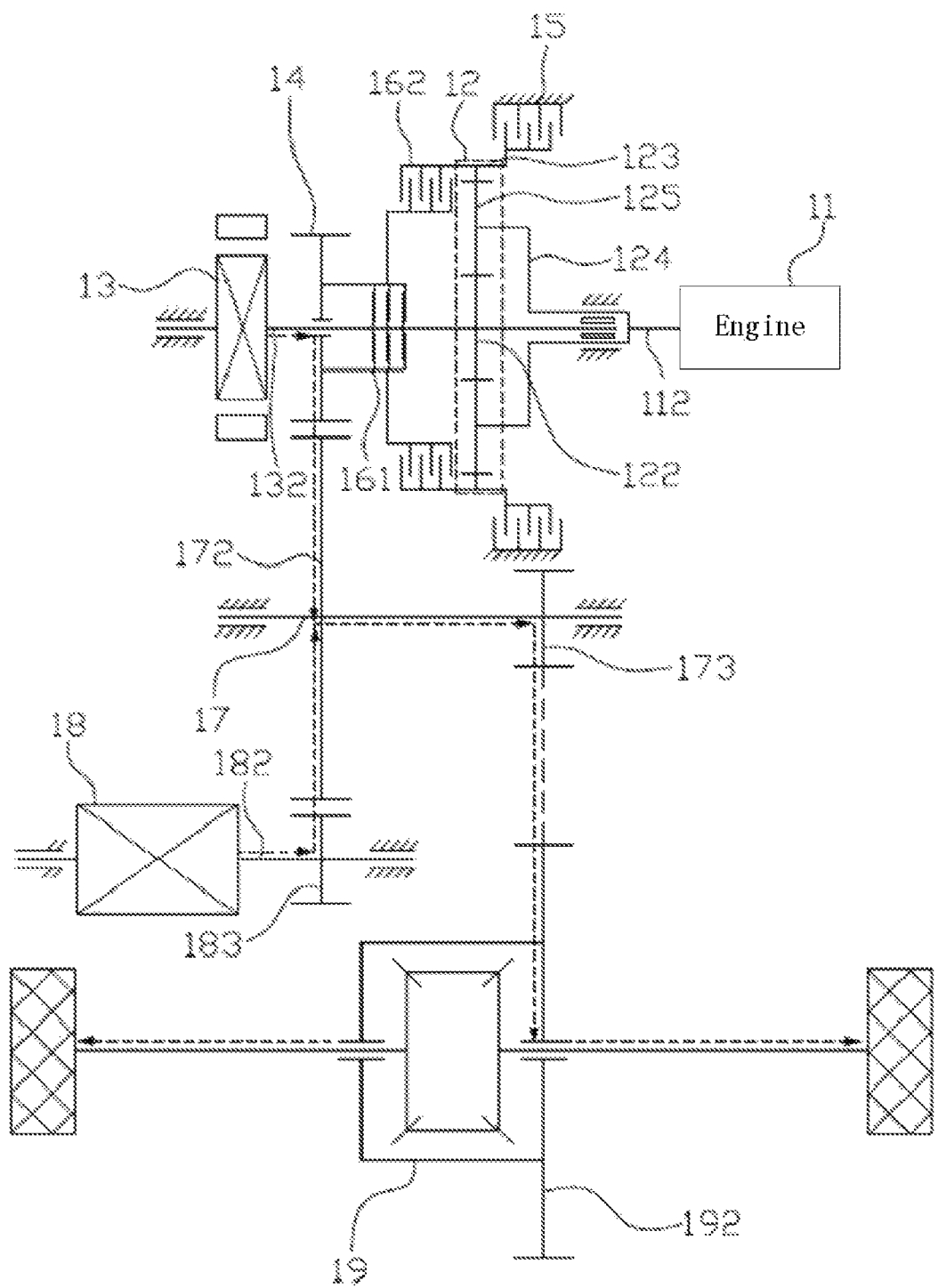
FIG. 3 is a schematic diagram of power transmission of the hybrid power driving system of FIG. 1 in a second-stage pure electric mode.

FIG. 3 is a schematic diagram of power transmission of the hybrid power driving system of FIG. 1 in a second-stage pure electric mode. The power transmission direction is as shown by the direction of an arrow in the figure. In the second-stage pure electric mode, the brake device 15, the second clutch 162 and the engine 11 do not operate, the first clutch 161 operates to fixedly connect the clutch gear 14 to the first motor output shaft 132, and both the first motor 13 and the second motor 18 perform driving. At this time, the power transmission has two paths, wherein the first path transmits power by the first motor 13 through the clutch gear 14 to the first gear 172, the intermediate shaft 17, the second gear 173, the differential gear 192, the differential 19, and the wheel end finally; and the second path transmits power by the second motor 18 through the third gear 183 to the first gear 172, the intermediate shaft 17, the second gear 173, the differential gear 192, the differential 19, and the wheel end finally. When the vehicle is driving at a high speed, the hybrid power driving system 10 can perform driving in the second-stage pure electric mode.

Figure 4:
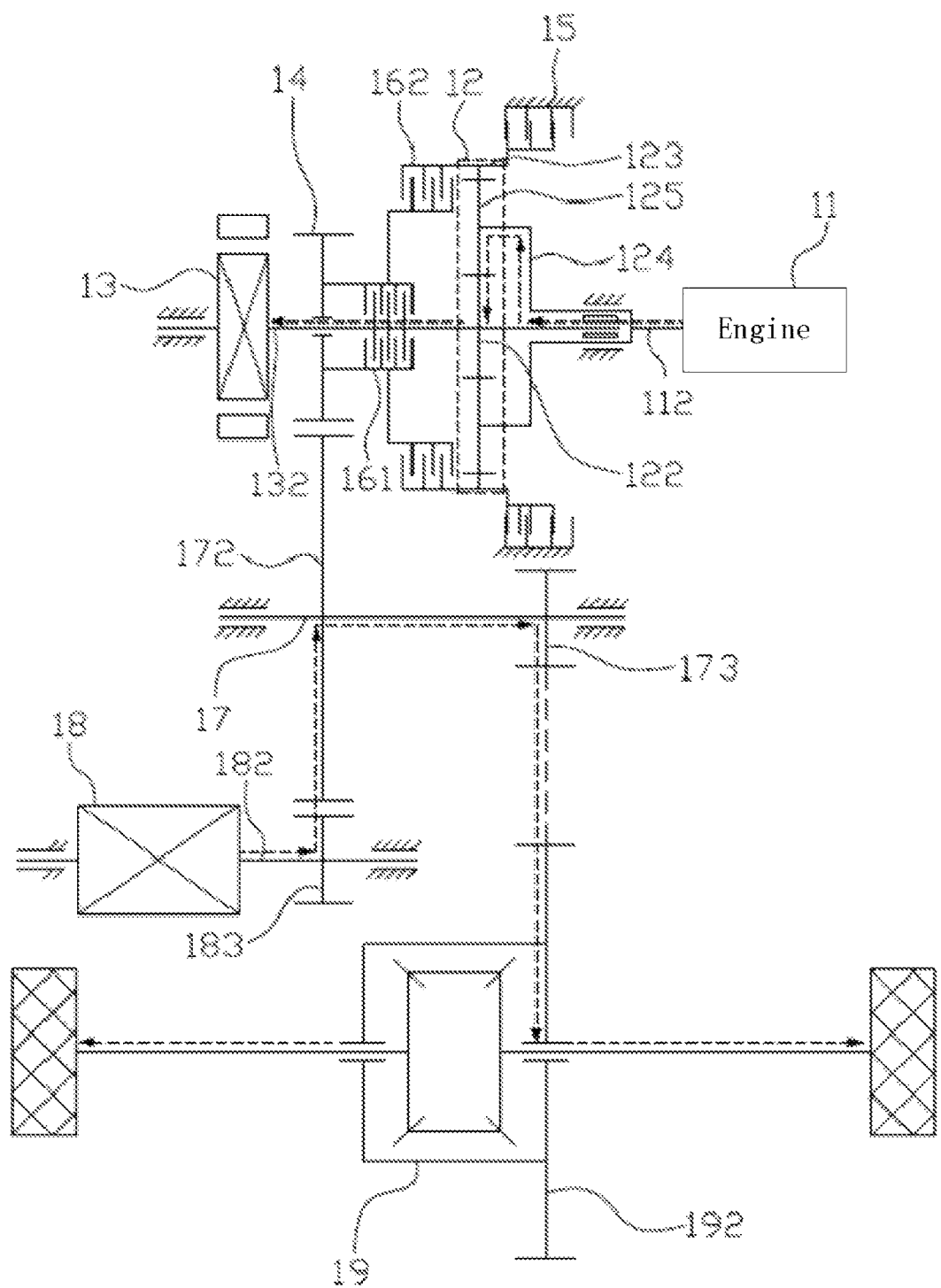
FIG. 4 is a schematic diagram of power transmission of the hybrid power driving system of FIG. 1 in an extended range mode.

FIG. 4 is a schematic diagram of power transmission of the hybrid power driving system of FIG. 1 in an extended range mode. The power transmission direction is as shown by the direction of an arrow in the figure. In the extended range mode, neither the first clutch 161 nor the second clutch 162 operates, the brake device 15 operates to brake the gear ring 123, the engine 11 drives the planetary carrier 124 to rotate to transmit power to the sun gear 122 and then to the first motor 13, the engine 11 drives the first motor 13 to generate electricity, and electric energy generated by the first motor 13 may exist in the power battery or may be supplied to the second motor 18 for driving of the second motor 18. At this time, the power transmission has a path that transmits power by the second motor 18 through the third gear 183 to the first gear 172, the intermediate shaft 17, the second gear 173, the differential gear 192, the differential 19, and the wheel end finally.

Figure 5:
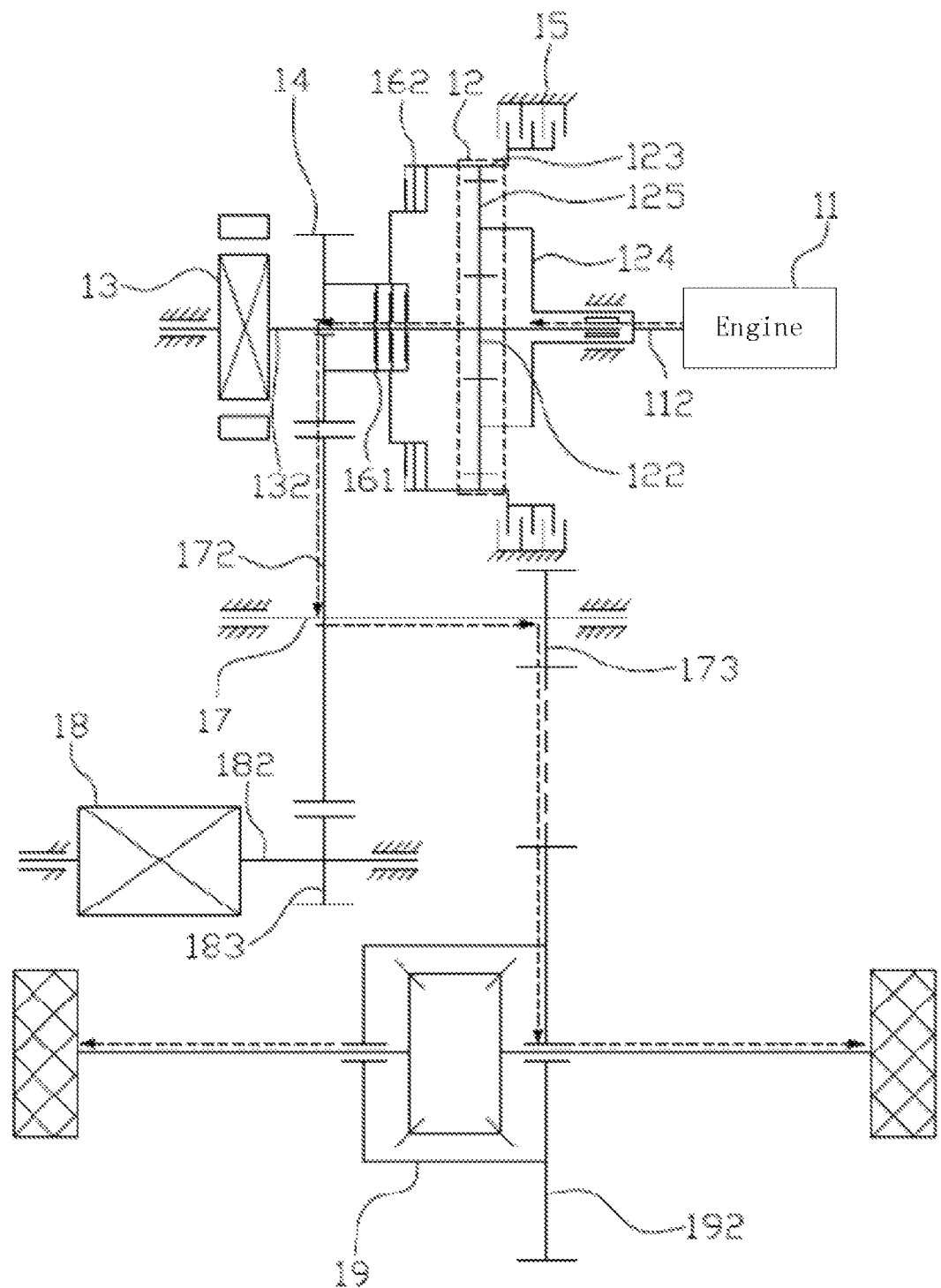
FIG. 5 is a schematic diagram of power transmission of the hybrid power driving system of FIG. 1 in a first-stage engine direct-drive mode.

FIG. 5 is a schematic diagram of power transmission of the hybrid power driving system of FIG. 1 in a first-stage engine direct-drive mode. The power transmission direction is as shown by the direction of an arrow in the figure. In the first-stage engine direct-drive mode, the brake device 15, the first motor 13 and the second motor 18 do not operate, the first clutch 161 operates to fixedly connect the clutch gear 14 to the first motor output shaft 132, the second clutch 162 operates to fixedly connect the clutch gear 14 to the gear ring 123, and the engine 11 performs driving. At this time, the speed ratio of the entire planetary gear device 12 is 1, the rotational speeds of the sun gear 122, the planetary carrier 124 and the gear ring 123 are the same, the power transmission has a path in which the engine 11 drives the entire planetary gear device 12 to rotate and transmits power through the clutch gear 14 to the first gear 172, the intermediate shaft 17, the second gear 173, the differential gear 192, the differential 19, and the wheel end finally. When the vehicle is driving at low to medium speeds, the hybrid power driving system 10 can perform driving in the first-stage engine direct-drive mode.

Figure 6:
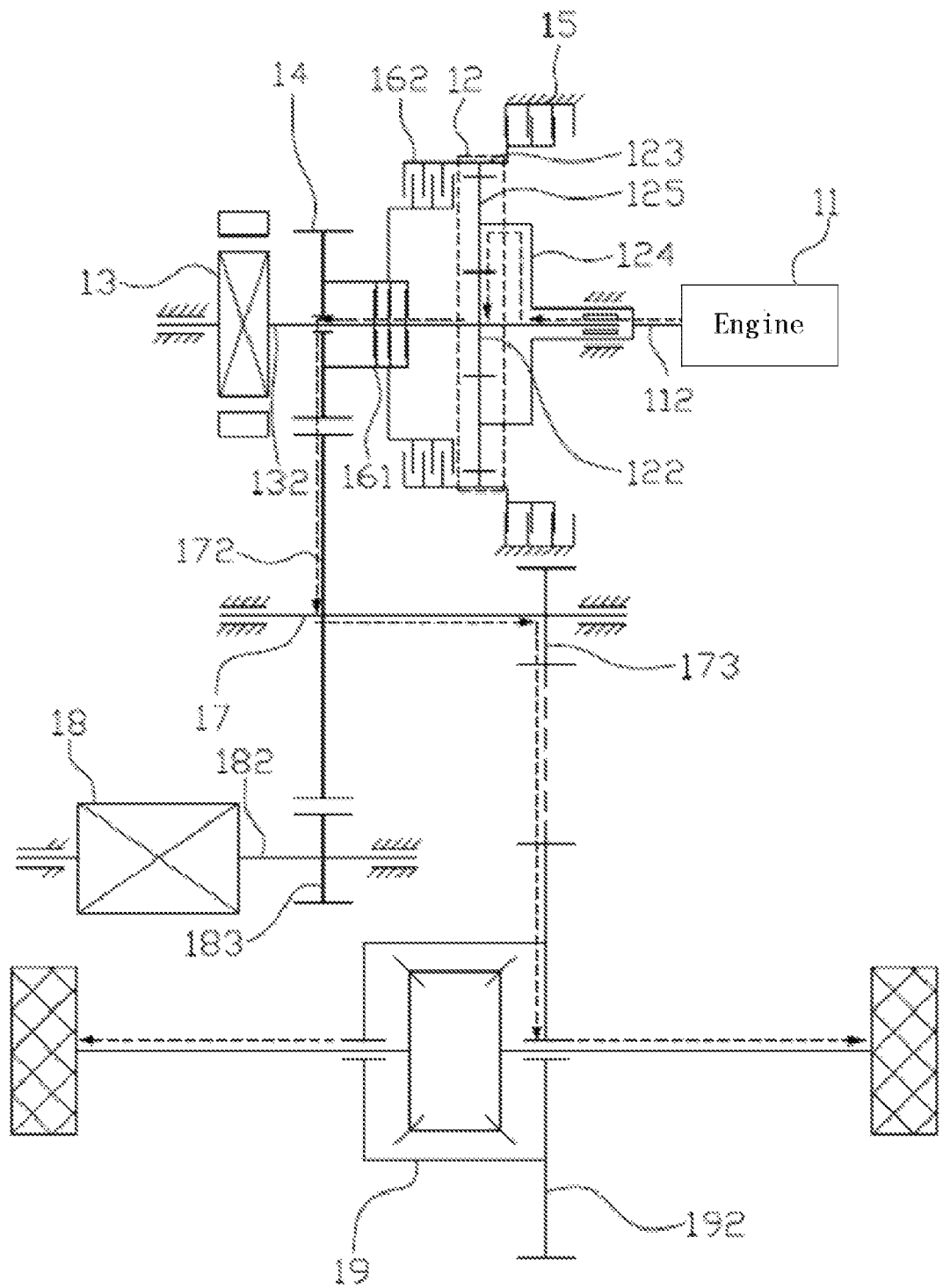
FIG. 6 is a schematic diagram of power transmission of the hybrid power driving system of FIG. 1 in a second-stage engine direct-drive mode.

FIG. 6 is a schematic diagram of power transmission of the hybrid power driving system of FIG. 1 in a second-stage engine direct-drive mode. The power transmission direction is as shown by the direction of an arrow in the figure. In the second-stage engine direct-drive mode, the second clutch 162, the first motor 13 and the second motor 18 do not operate, the first clutch 161 operates to fixedly connect the clutch gear 14 to the first motor output shaft 132, the brake device 15 operates to brake the gear ring 123, and the engine 11 performs driving. At this time, the power transmission has a path in which the engine 11 drives the planetary carrier 124 to rotate, transmits power to the sun wheel 122 and then transmits the power by the clutch gear 14 to the first gear 172, the intermediate shaft 17, the second gear 173, the differential gear 192, the differential 19, and the wheel end finally. When the vehicle is driving at medium to high speeds, the hybrid power driving system 10 can perform driving in the second-stage engine direct-drive mode.

Figure 7:
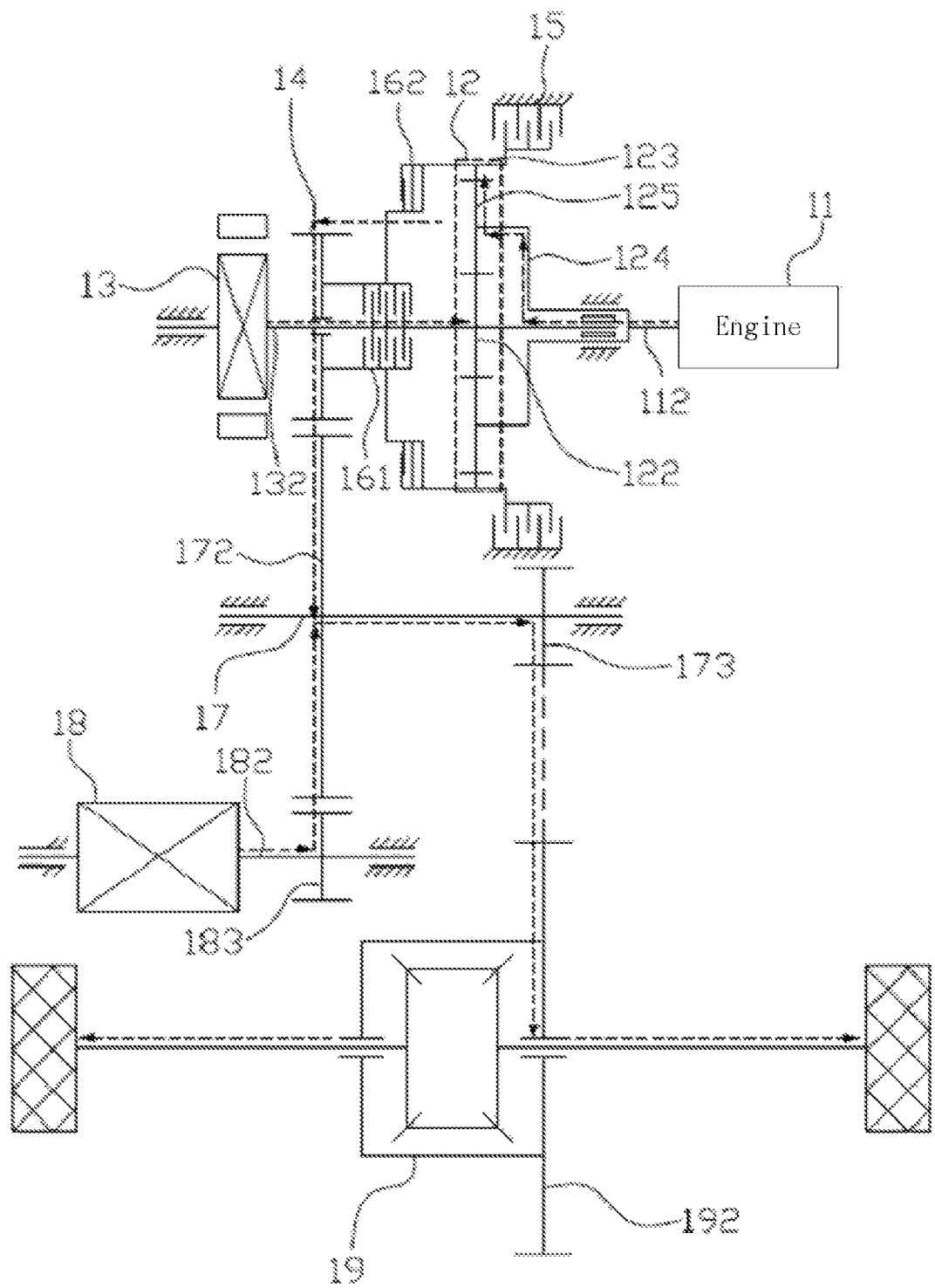
FIG. 7 is a schematic diagram of power transmission of the hybrid power driving system of FIG. 1 in a first-stage hybrid power mode.

FIG. 7 is a schematic diagram of power transmission of the hybrid power driving system of FIG. 1 in a first-stage hybrid power mode. The power transmission direction is as shown by the direction of an arrow in the figure. In the first-stage hybrid power mode, neither the brake device 15 nor the first clutch 161 operates, the second clutch 162 operates to fixedly connect the clutch gear 14 to the gear ring 123, the engine 11 drives the planetary carrier 124 to rotate, the first motor 13 drives the sun gear 122 to rotate, the engine 11 and the first motor 13 are steplessly coupled by the planetary gear device 12, and the engine 11, the first motor 13 and the second motor 18 perform driving jointly. At this time, the power transmission has two paths, wherein in the first path, power of the engine 11 is transmitted by the planetary carrier 124, power of the first motor 13 is transmitted by the sun gear 122, and the power of the engine 11 and the first motor 13 is steplessly coupled by the planetary gear device 12, output by the gear ring 123, and transmitted through the clutch gear 143 to the first gear 172, the intermediate shaft 17, the second gear 173, the differential gear 192, the differential 19, and the wheel end finally; and in the second path, power is transmitted by the second motor 18 through the third gear 183 to the first gear 172, the intermediate shaft 17, the second gear 173, the differential gear 192, the differential 19, and the wheel end finally. It is worth mentioning that when the hybrid power driving system 10 performs driving in the first-stage hybrid power mode, the system is in an Electronic Controlled Variable Transmission (ECVT) stepless speed regulation mode, and the operating point of the engine 11 can be adjusted by the first motor 13 and the second motor 18, so that the engine 11 is always operating in a high efficiency zone, which ensures system power and economy. When the vehicle is driving at a full speed, the hybrid power driving system 10 can perform driving in the first-stage hybrid power mode.

Figure 8:
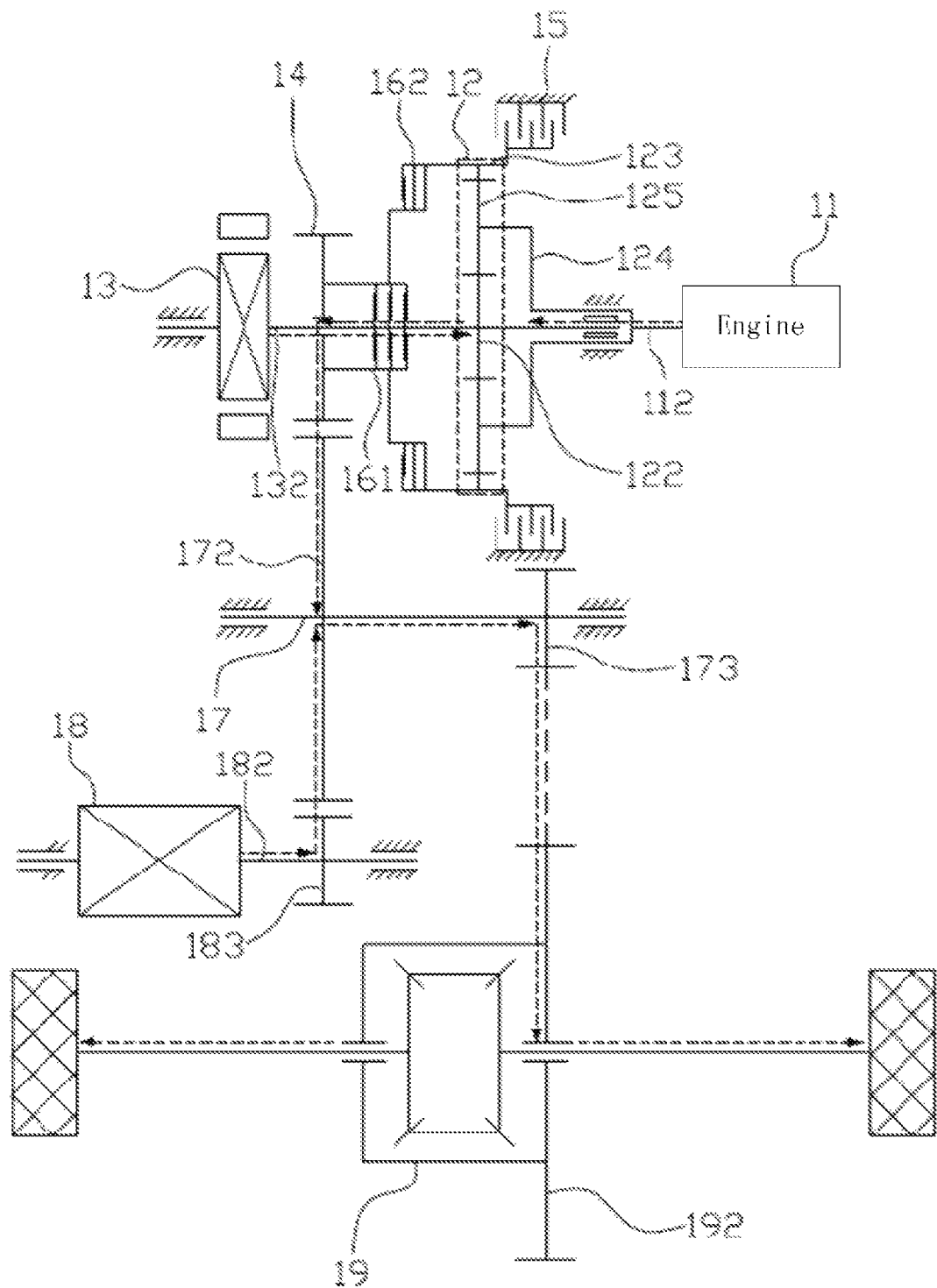
FIG. 8 is a schematic diagram of power transmission of the hybrid power driving system of FIG. 1 in a second-stage hybrid power mode.

FIG. 8 is a schematic diagram of power transmission of the hybrid power driving system of FIG. 1 in a second-stage hybrid power mode. The power transmission direction is as shown by the direction of an arrow in the figure. In the second-stage hybrid power mode, the brake device 15 does not operate, the first clutch 161 operates to fixedly connect the clutch gear 14 to the first motor output shaft 132, the second clutch 162 operates to fixedly connect the clutch gear 14 to the gear ring 123, and the engine 11, the first motor 13 and the second motor 18 perform driving. At this time, the speed ratio of the entire planetary gear device 12 is 1, the rotational speeds of the sun gear 122, the planetary carrier 124 and the gear ring 123 are the same, and the power transmission has two paths, wherein in the first path, power of the engine 11 is transmitted by the planetary carrier 124, power of the first motor 13 is transmitted by the sun gear 122, and the power is transmitted through the clutch gear 14 to the first gear 172, the Intermediate shaft 17, the second gear 173, the differential gear 192, the differential 19, and the wheel end finally; and in the second path, power is transmitted by the second motor 18 through the third gear 183 to the first gear 172, the intermediate shaft 17, the second gear 173, the differential gear 192, the differential 19, and the wheel end finally. When the vehicle is driving at low to medium speeds, the hybrid power driving system 10 can perform driving in the second-stage hybrid power mode.

Figure 9:
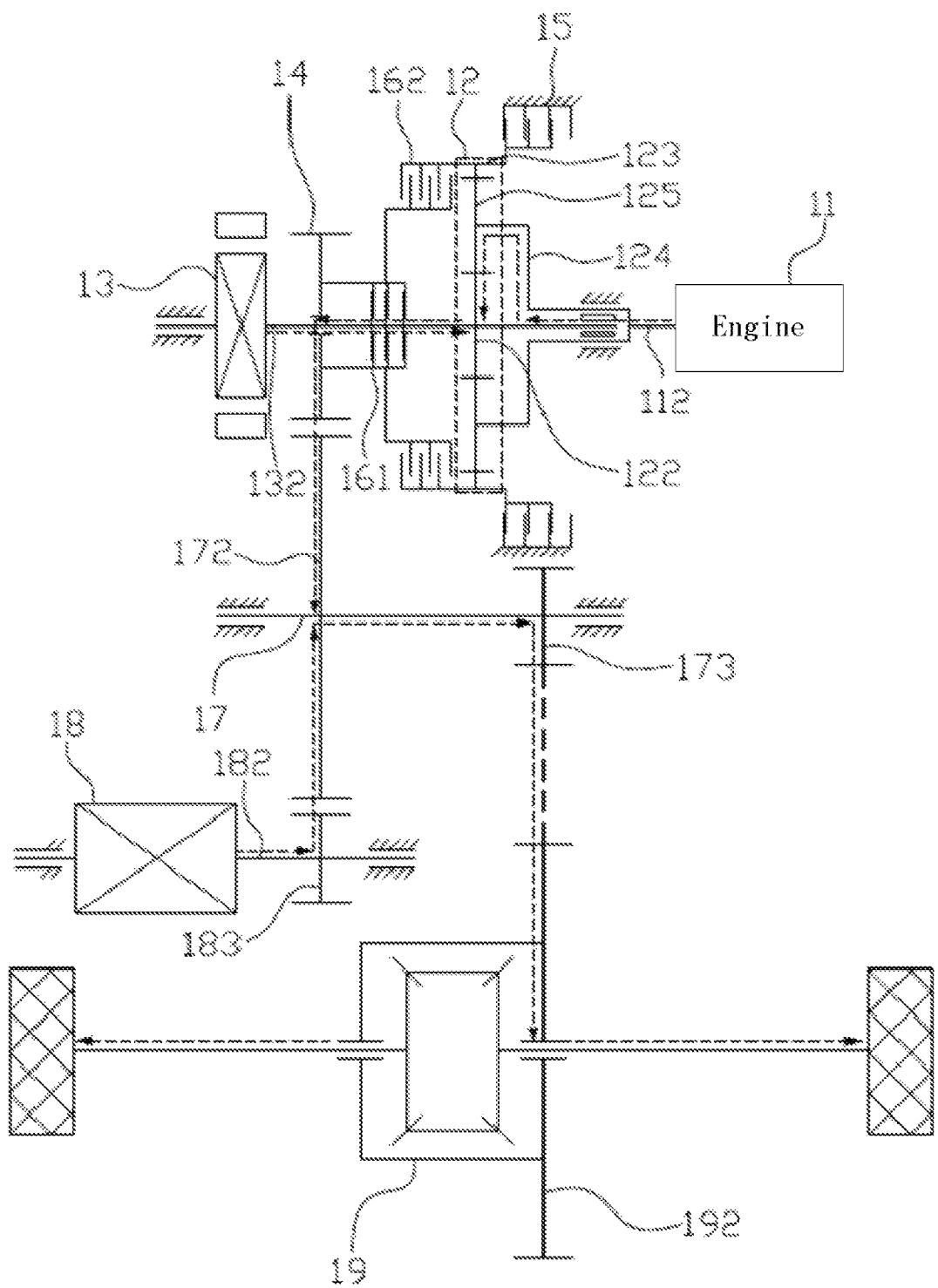
FIG. 9 is a schematic diagram of power transmission of the hybrid power driving system of FIG. 1 in a third-stage hybrid power mode.

FIG. 9 is a schematic diagram of power transmission of the hybrid power driving system of FIG. 1 in a third-stage hybrid power mode. The power transmission direction is as shown by the direction of an arrow in the figure. In the third-stage hybrid power mode, the second clutch 162 does not operate, the first clutch 161 operates to fixedly connect the clutch gear 14 to the first motor output shaft 132, the brake device 15 operates to brake the gear ring 123, and the engine 11, the first motor 13 and the second motor 18 all perform driving. At this time, the power transmission has two paths, wherein in the first path, the engine 11 drives the planetary carrier 124 to rotate to transmit power to the sun gear 122, the first motor 13 also transmits power to the sun gear 122, and after the power is coupled, the power is transmitted by the clutch gear 14 to the first gear 172, the intermediate shaft 17, the second gear 173, the differential gear 192, the differential 19, and the wheel end finally; and in the second path, power is transmitted by the second motor 18 through the third gear 183 to the first gear 172, the intermediate shaft 17, the second gear 173, the differential gear 192, the differential 19, and the wheel end finally. When the vehicle is driving at medium to high speeds, the hybrid power driving system 10 can perform driving in the third-stage hybrid power mode.

Figure 10:
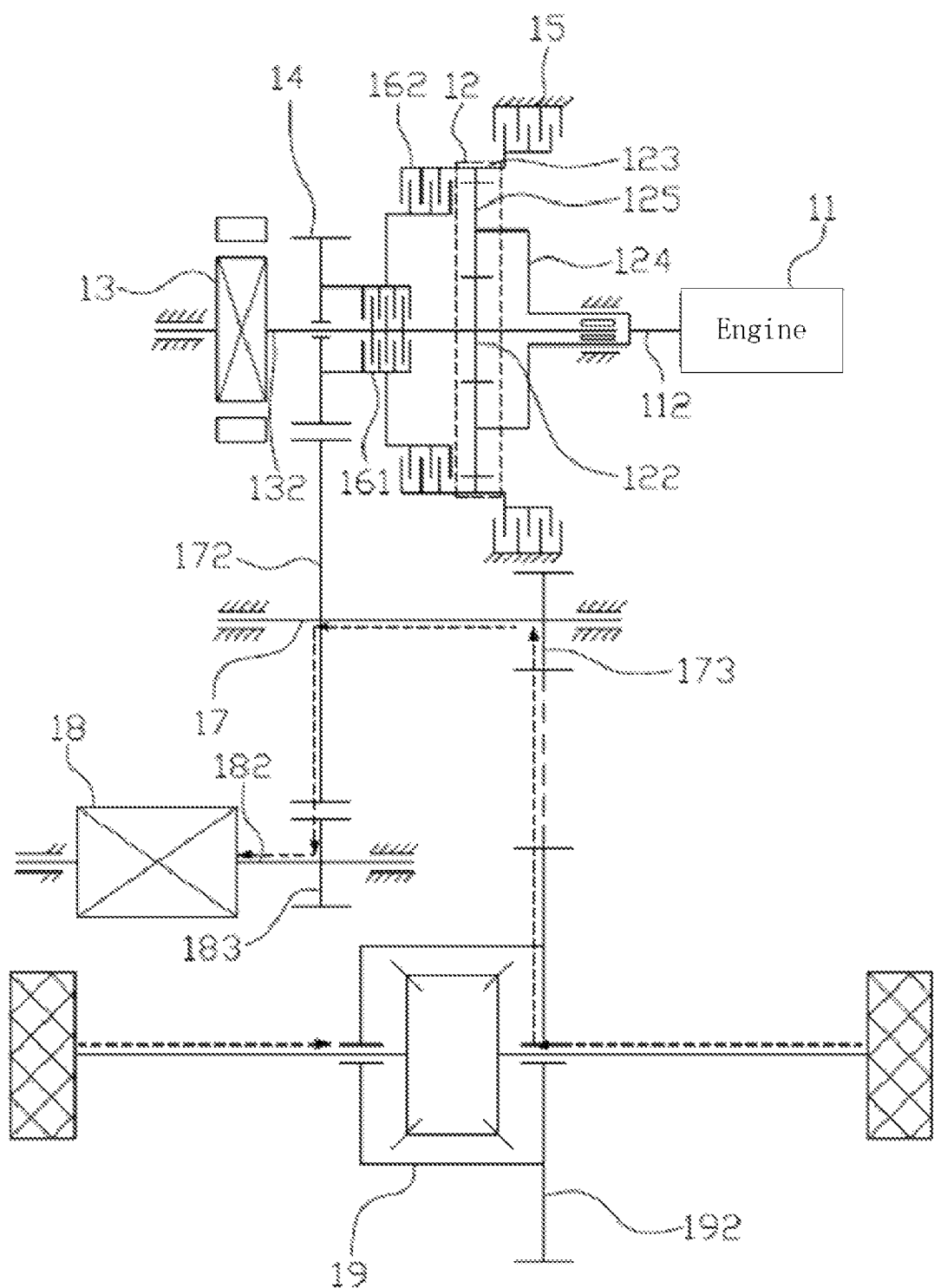
FIG. 10 is a schematic diagram of power transmission of the hybrid power driving system of FIG. 1 in a brake power generation mode.

FIG. 10 is a schematic diagram of power transmission of the hybrid power driving system of FIG. 1 in a brake power generation mode. The power transmission direction is as shown by the direction of an arrow in the figure. In the brake power generation mode, all of the brake device 15, the first clutch 161, the second clutch 162, the engine 11 and the first motor 13 do not operate. At this time, power during vehicle brake is transmitted to the second motor 18 for power generation from the wheel end, and the power passes through the differential 19, the differential gear 192, the second gear 173, the first gear 172 and the third gear 183 from the wheel end and then is transmitted to the second motor 18 to drive the second motor 18 to rotate to generate electric energy.

The hybrid power driving system of the present embodiment 10 has a first-stage pure electric mode, a second-stage pure electric mode, an extended range mode, a first-stage engine direct-drive mode, a second-stage engine direct-drive mode, a first-stage hybrid power mode, a second-stage hybrid power mode, a third-stage hybrid power mode, and a brake power generation mode. Different modes can be automatically switched according to an SOC value and a vehicle speed requirement of the power battery. For example, a magnitude relationship between the SOC value of the power battery and a first threshold is determined, or a magnitude relationship between the SOC value of the power battery and a first threshold and a magnitude relationship between a vehicle speed and a second threshold are simultaneously determined. The operating modes of the hybrid power driving system 10 are switched according to the determination result. It is to be noted that the first threshold is used to determine the level of the SOC value of the power battery, and the second threshold is used to determine the level of the vehicle speed. In the present embodiment, the range of the first threshold and the second threshold is not limited. Generally, it can be freely set according to a specific control strategy. Under different control strategies, the values of the first threshold and the second threshold are different. After the first threshold and the second threshold are set, automatic determination is performed, and automatic switching between various modes is performed according to the determination result. The above operating mode is embodied in the following table:

Second Embodiment

Figure 11:
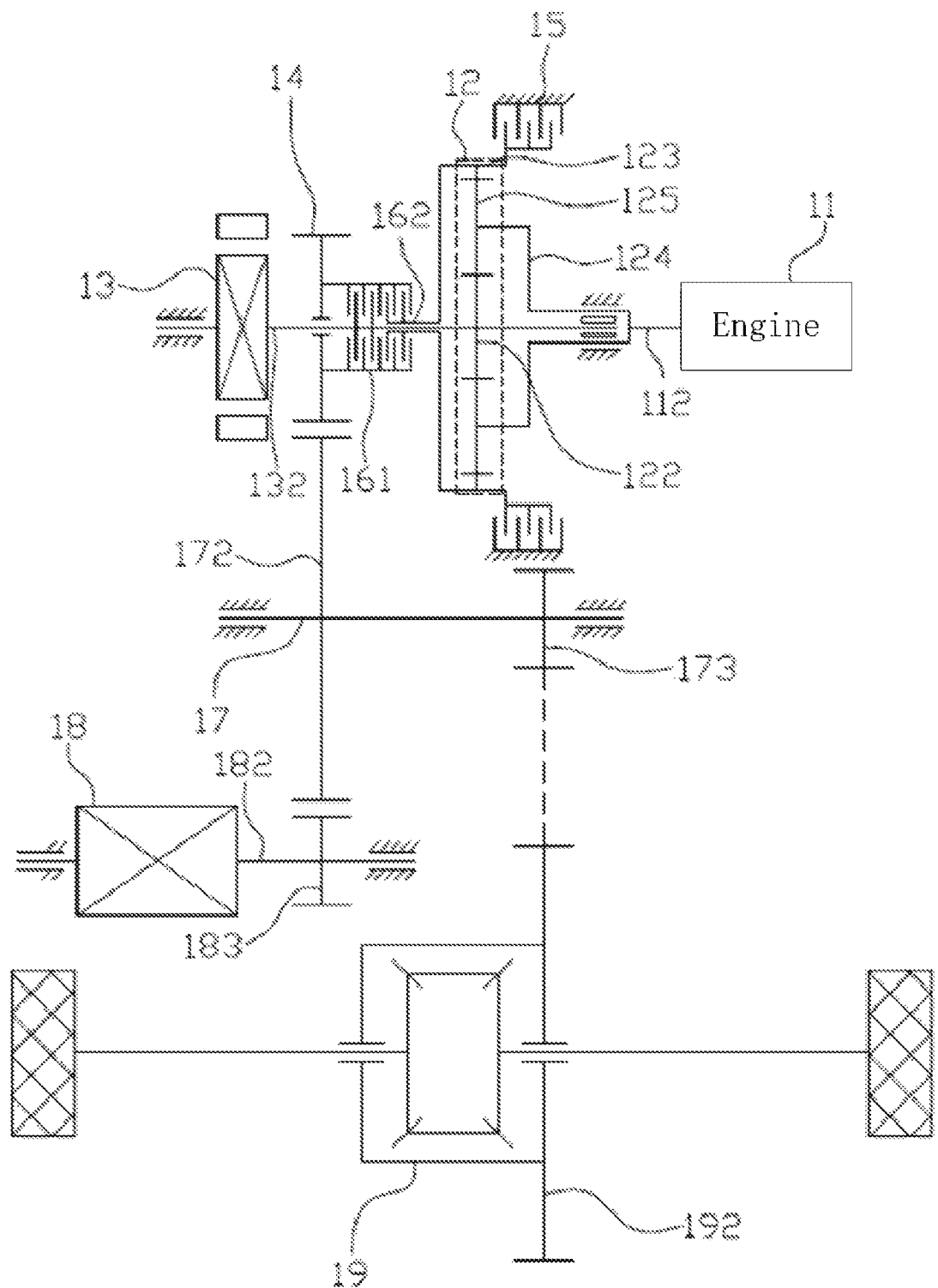
FIG. 11 is a structure diagram of a hybrid power driving system according to a second embodiment of the present disclosure.

FIG. 11 is a structure diagram of a hybrid power driving system according to a second embodiment of the present disclosure. As shown in FIG. 11, the hybrid power driving system 10 of the present embodiment is substantially the same as the above first embodiment, except for the mounting positions of the first clutch 161 and the second clutch 162.

Specifically, in the present embodiment, the second clutch 162 is disposed in the first clutch 161, so that the first clutch 161 and the second clutch 162 are integrated in the same housing, and the first clutch 161 and the second clutch 162 are coaxially disposed along the first motor output shaft 132, thereby greatly reducing the volume occupied by independent arrangement of the first clutch 161 and the second clutch 162, and reserving space for arrangement of other elements of the engine.

Third Embodiment

Figure 12:
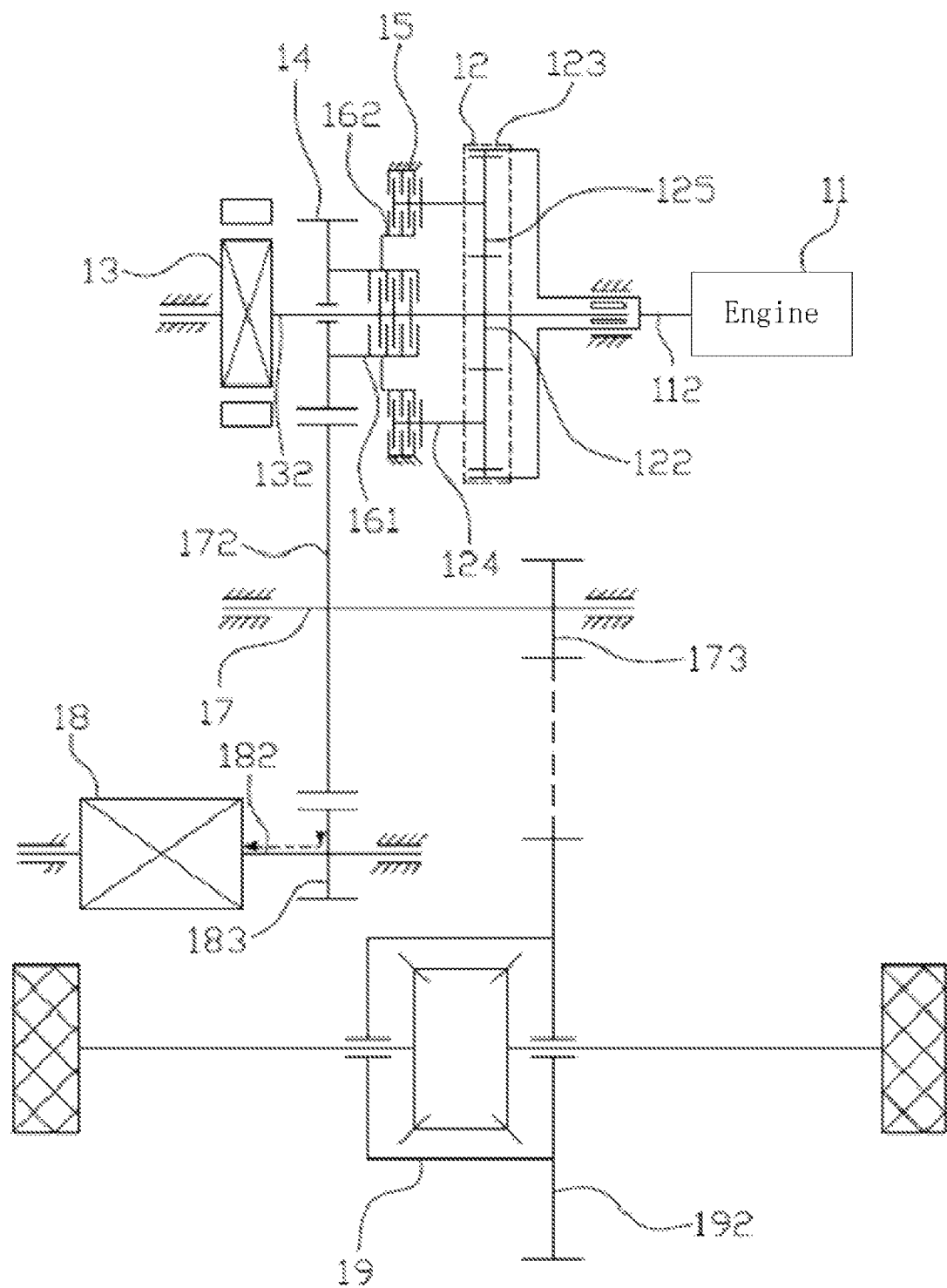
FIG. 12 is a structure diagram of a hybrid power driving system according to a third embodiment of the present disclosure.

FIG. 12 is a structure diagram of a hybrid power driving system according to a third embodiment of the present disclosure; and As shown in FIG. 12, the hybrid power driving system 10 of the present embodiment is substantially the same as the above first embodiment, except for the connection relationship between the engine 11 and the planetary gear device 12 and the connection relationship between the clutch gear 14 and the planetary gear device 12.

Specifically, in the present embodiment, the first rotating element connected to the first motor output shaft 132 is the sun gear 122, the second rotating element connected to the engine output shaft 112 is the gear ring 123, and the third rotating element is the planetary carrier 124.

| | Power device | | | Execution element | | | Use condition | |
|---|---|---|---|---|---|---|---|---|
| Mode | Engine | First motor | Second motor | First clutch | Second clutch | Brake device | SOC | Vehicle speed |
| First-stage pure electric mode | \ | \ | Drive | Disengagement | Disengagement | \ | High | Low to medium speed |
| Second-stage pure electric mode | \ | Drive | Drive | Engagement | Disengagement | \ | High | High speed |
| Extended range mode | Power generation | Power generation | Drive | Disengagement | Disengagement | Brake | Low | Low to medium speed |
| First-stage engine direct-drive speed mode | Drive | \ | \ | Engagement | Engagement | \ | \ | Low to medium |
| Second-stage engine direct-drive mode | Drive | \ | \ | Engagement | Disengagement | Brake | \ | Medium to high speed |
| First-stage hybrid power mode | Drive | Power generation | Drive | Disengagement | Engagement | \ | \ | Full speed |
| Second-stage hybrid power mode | Drive | Power generation | Drive | Engagement | Engagement | \ | \ | Low to medium speed |
| Third-stage hybrid power mode | Drive | Power generation | Drive | Disengagement | Engagement | Brake | \ | Medium to high speed |
| Brake power generation mode | \ | \ | Power generation | Disengagement | Disengagement | \ | \ | Brake |

That is, in the present embodiment, the sun gear 122 is connected to the first motor output shaft 132, the gear ring 123 is connected to the engine output shaft 112, and the planetary carrier 124 is connected to the clutch gear 14 through the second clutch 162.

In the present embodiment, the clutch gear 14 is connected to the planetary carrier 124 through the second clutch 162, and the second clutch 162 is configured to engage or disengage the clutch gear 14 with/from the planetary carrier 124. When the second clutch 162 operates, the second clutch 162 fixedly connects the clutch gear 14 to the planetary carrier 124. At this time, the clutch gear 14 synchronously rotates with the planetary carrier 124. When the second clutch 162 does not operate, the clutch gear 14 and the planetary carrier 124 are separated from each other.

In the present embodiment, the brake device 15 is configured to brake or unlock the planetary carrier 124. When the brake device 15 operates, the brake device 15 brakes the planetary carrier 124, and at this time, the planetary carrier 124 cannot rotate. When the brake device 15 does not operate, the brake device 15 unlocks the planetary carrier 124, and at this time, the planetary carrier 124 can rotate.

The hybrid power driving system of the present embodiment 10 has a first-stage pure electric mode, a second-stage pure electric mode, an extended range mode, a first-stage engine direct-drive mode, a second-stage engine direct-drive mode, a first-stage hybrid power mode, a second-stage hybrid power mode, a third-stage hybrid power mode, and a brake power generation mode.

The connection relationship between the remaining components of the hybrid power driving system 10 in the present embodiment and the driving principle thereof in various operating modes may be understood with reference to the above first embodiment, and details are not described herein again.

Fourth Embodiment

Figure 13:
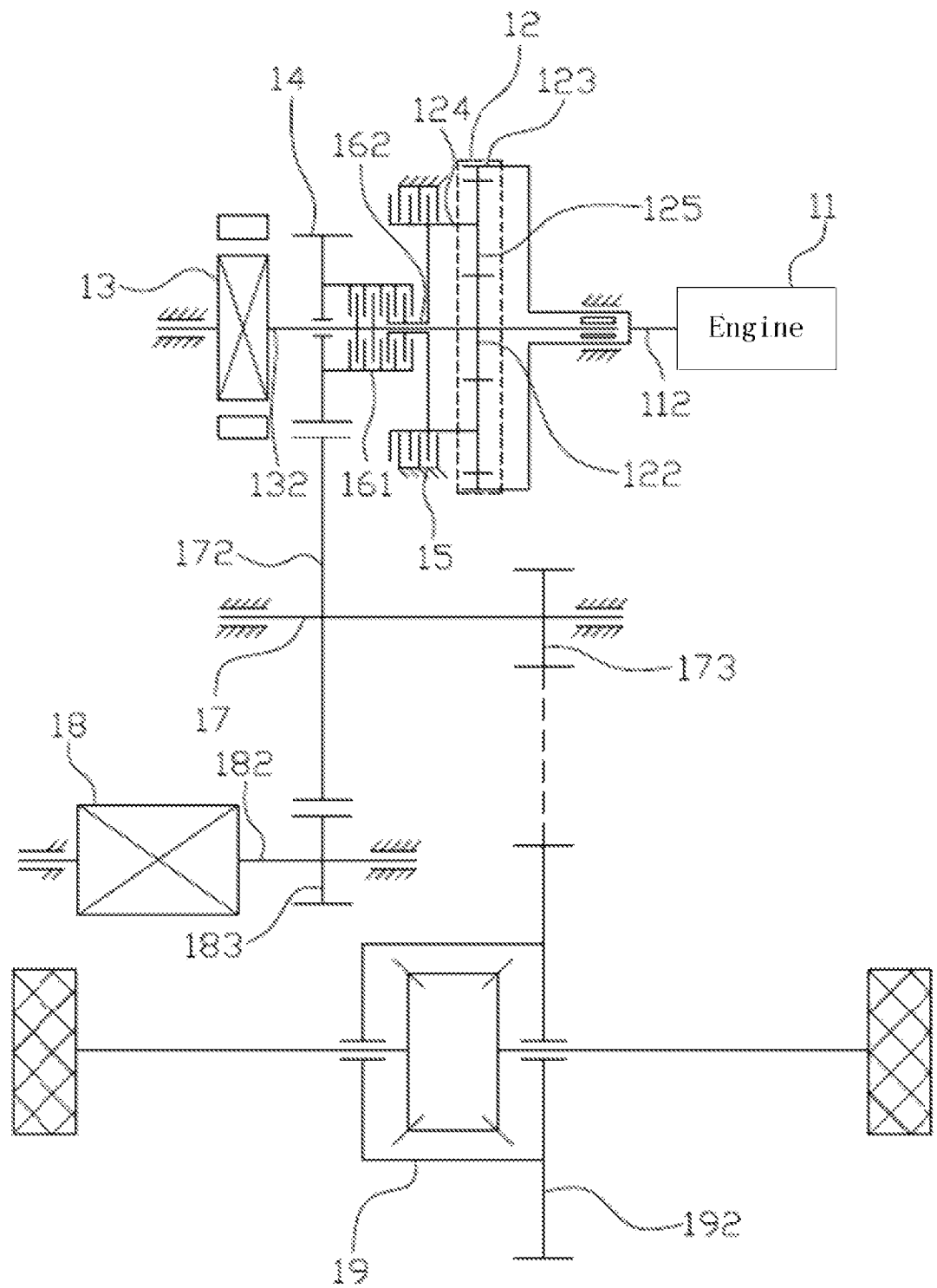
FIG. 13 is a structure diagram of a hybrid power driving system according to a fourth embodiment of the present disclosure.

FIG. 13 is a structure diagram of a hybrid power driving system according to a fourth embodiment of the present disclosure. As shown in FIG. 13, the hybrid power driving system 10 of the present embodiment is substantially the same as the above third embodiment, except for the mounting positions of the first clutch 161 and the second clutch 162.

Specifically, in the present embodiment, the second clutch 162 is disposed in the first clutch 161, so that the first clutch 161 and the second clutch 162 are integrated in the same housing, and the first clutch 161 and the second clutch 162 are coaxially disposed along the first motor output shaft 132, thereby greatly reducing the volume occupied by independent arrangement of the first clutch 161 and the second clutch 162, and reserving space for arrangement of other elements of the engine.

The hybrid power driving system provided by the embodiments of the present disclosure has a simple overall structure, has multiple operating modes such as a single-motor pure electric mode, a dual-motor pure electric mode, an extended range mode, two engine direct-drive modes, three hybrid power modes and a brake power generation mode, can automatically switch different modes according to an SOC value and vehicle speed requirement of a battery, and has strong flexibility; moreover, during switching of the operating modes, a second motor participates in driving, and power is not interrupted. In addition, an engine and a first motor are connected by a planetary gear device, the speed ratio is adjustable, and the speed ratio range is large, which can effectively reduce the volume of the first motor. The hybrid power driving system can cover HEV and PHEV, and the platformization is good.

The above implementations are merely embodiments of the present disclosure, and are not intended to limit the scope of implementations and claims of the present disclosure, and any equivalent changes and modifications made in the scope of protection of the present disclosure should fall within the scope of patent protection of the present disclosure.

INDUSTRIAL APPLICABILITY

The hybrid power driving system provided by the embodiments of the present disclosure has a simple overall structure, has multiple operating modes such as a single-motor pure electric mode, a dual-motor pure electric mode, an extended range mode, two engine direct-drive modes, three hybrid power modes and a brake power generation mode, can automatically switch different modes according to an SOC value and vehicle speed requirement of a battery, and has strong flexibility; moreover, during switching of the operating modes, a second motor participates in driving, and power is not interrupted. In addition, an engine and a first motor are connected by a planetary gear device, the speed ratio is adjustable, and the speed ratio range is large, which can effectively reduce the volume of the first motor. The hybrid power driving system can cover HEV and PHEV, and the platformization is good.

What is claimed is:

1. A hybrid power driving system, comprising an engine (11), a planetary gear device (12), a first motor (13), a clutch gear (14), a brake device (15), a first clutch (161), a second clutch (162), an intermediate shaft (17), and a second motor (18), wherein the engine (11) and the first motor (13) are connected by the planetary gear device (12), the planetary gear device (12) comprises a first rotating element, a second rotating element and a third rotating element, the first rotating element, the second rotating element and the third rotating element are one of a sun gear (122), a planetary carrier (124) and a gear ring (123), respectively, the engine (11) has an engine output shaft (112), the first motor (13) has a first motor output shaft (132), the first rotating element is connected to the first motor output shaft (132), and the second rotating element is connected to the engine output shaft (112);

the clutch gear (14) is sleeved on the first motor output shaft (132), the clutch gear (14) is connected to the first motor output shaft (132) through the first clutch (161), the first clutch (161) is configured to engage or disengage the clutch gear (14) with/from the first motor output shaft (132), the clutch gear (14) is connected to the third rotating element through the second clutch (162), the second clutch (162) is configured to engage or disengage the clutch gear (14) with/from the third rotating element, and the clutch gear (14) is connected to the intermediate shaft (17) and outputs power to a wheel end through the Intermediate shaft (17);

the brake device (15) is configured to brake or unlock the third rotating element; and the second motor (18) is connected to the intermediate shaft (17) and outputs power to the wheel end through the intermediate shaft (17).

2. The hybrid power driving system as claimed in claim 1, wherein the first rotating element is the sun gear (122), the second rotating element is the planetary carrier (124), and the third rotating element is the gear ring (123).

3. The hybrid power driving system as claimed in claim 2, wherein the first clutch (161) and the second clutch (162) are integrated in the same housing.

4. The hybrid power driving system as claimed in claim 1, wherein the first rotating element is the sun gear (122), the second rotating element is the gear ring (123), and the third rotating element is the planetary carrier (124).

5. The hybrid power driving system as claimed in claim 4, wherein the first clutch (161) and the second clutch (162) are integrated in the same housing.

6. The hybrid power driving system as claimed in claim 1, wherein the clutch motor (14) is disposed between the first motor (13) and the planetary gear device (12).

7. The hybrid power driving system as claimed in claim 1, wherein a driving disc of the first clutch (161) is fixedly connected to the first motor output shaft (132), the clutch gear (14) is fixedly connected to a driven disc of the first clutch (161), one rotating disc of the second clutch (162) is fixedly connected to the driven disc of the first clutch (161), and the other rotating disc of the second clutch (162) is fixedly connected to the third rotating element.

8. The hybrid power driving system as claimed in claim 1, wherein a first gear (172) and a second gear (173) are fixed to the intermediate shaft (17), and the first gear (172) is meshed with the clutch gear (14); the second motor (18) has a second motor output shaft (182), a third gear (183) is fixed to the second motor output shaft (182), and the third gear (183) is meshed with the first gear (172); and the hybrid power driving system further comprises a differential (19), a differential gear (192) is disposed on the differential (19), and the second gear (173) is meshed with the differential gear (192).

9. The hybrid power driving system as claimed in claim 8, wherein the hybrid power driving system has a first-stage pure electric mode and a second-stage pure electric mode; in the first-stage pure electric mode, the brake device (15), the first clutch (161), the second clutch (162), the engine (11) and the first motor (13) do not operate, and the second motor (18) performs driving; and in the second-stage pure electric mode, the brake device (15), the second clutch (162) and the engine (11) do not operate, the first clutch (161) operates to fixedly connect the clutch gear (14) to the first motor output shaft (132), and both the first motor (13) and the second motor (18) perform driving.

10. The hybrid power driving system as claimed in claim 8, wherein the hybrid power driving system has an extended range mode; and in the extended range mode, neither the first clutch (161) nor the second clutch (162) operates, the brake device (15) operates to brake the third rotating element, the engine (11) drives the first motor (13) to generate electricity, and the second motor (18) performs driving.

11. The hybrid power driving system as claimed in claim 8, wherein the hybrid power driving system has a first-stage engine direct-drive mode and a second-stage engine direct-drive mode; in the first-stage engine direct-drive mode, the brake device (15), the first motor (13) and the second motor (18) do not operate, the first clutch (161) operates to fixedly connect the clutch gear (14) to the first motor output shaft (132), the second clutch (162) operates to fixedly connect the clutch gear (14) to the third rotating element, and the engine (11) performs driving; and in the second-stage engine direct-drive mode, the second clutch (162), the first motor (13) and the second motor (18) do not operate, the first clutch (161) operates to fixedly connect the clutch gear (14) to the first motor output shaft (132), the brake device (15) operates to brake the third rotating element, and the engine (11) performs driving.

12. The hybrid power driving system as claimed in claim 8, wherein the hybrid power driving system has a first-stage hybrid power mode, a second-stage hybrid power mode and a third-stage hybrid power mode; in the first-stage hybrid power mode, neither the brake device (15) nor the first clutch (161) operates, the second clutch (162) operates to fixedly connect the clutch gear (14) to the third rotating element, and the engine (11), the first motor (13) and the second motor (18) perform driving; in the second-stage hybrid power mode, the brake device (15) does not operate, the first clutch (161) operates to fixedly connect the clutch gear (14) to the first motor output shaft (132), the second clutch (162) operates to fixedly connect the clutch gear (14) to the third rotating element, and the engine (11), the first motor (13) and the second motor (18) perform driving; and in the third-stage hybrid power mode, the second clutch (162) does not operate, the first clutch (161) operates to fixedly connect the clutch gear (14) to the first motor output shaft (132), the brake device (15) operates to brake the third rotating element, and the engine (11), the first motor (13) and the second motor (18) perform driving.

13. The hybrid power driving system as claimed in claim 8, wherein the hybrid power driving system has a brake power generation mode; and in the brake power generation mode, the brake device (15), the first clutch (161), the second clutch (162), the engine (11) and the first motor (13) do not operate, and power during vehicle brake is transmitted to the second motor (18) by the wheel end for power generation.

14. The hybrid power driving system as claimed in claim 1, wherein the first motor (13), the clutch gear (14), the planetary gear device (12) and the engine (11) are coaxially disposed.

15. The hybrid power driving system as claimed in claim 1, wherein the brake device (15) is a brake or a one-way clutch.

* * * * *